United States Patent [19]

Arnott et al.

[11] Patent Number: 5,712,970
[45] Date of Patent: Jan. 27, 1998

[54] METHOD AND APPARATUS FOR RELIABLY STORING DATA TO BE WRITTEN TO A PERIPHERAL DEVICE SUBSYSTEM USING PLURAL CONTROLLERS

[75] Inventors: Randolph Arnott, Mount Vernon, N.H.; Timothy Flavin, Framingham, Mass.

[73] Assignee: EMC Corporation, Hopkinton, Mass.

[21] Appl. No.: 535,595

[22] Filed: Sep. 28, 1995

[51] Int. Cl.[6] .................................................. G06F 11/16
[52] U.S. Cl. ............................. 395/182.04; 395/182.03; 395/440
[58] Field of Search ........................... 395/440, 441, 395/182.03, 182.04, 182.05, 182.2

[56] References Cited

U.S. PATENT DOCUMENTS

| | | | |
|---|---|---|---|
| 5,369,751 | 11/1994 | Kambayashi et al. | 395/894 |
| 5,369,753 | 11/1994 | Tipley | 395/449 |
| 5,420,994 | 5/1995 | King et al. | 395/471 |
| 5,423,018 | 6/1995 | Dang et al. | 395/486 |
| 5,459,857 | 10/1995 | Ludlam et al. | 395/182.04 |
| 5,586,248 | 12/1996 | Alexander et al. | 395/182.2 |
| 5,586,291 | 12/1996 | Lasker et al. | 395/440 |
| 5,588,110 | 12/1996 | DeKoning et al. | 395/182.03 |
| 5,600,816 | 2/1997 | Oldfield et al. | 395/440 |
| 5,619,642 | 4/1997 | Nielson et al. | 395/182.04 |

*Primary Examiner*—Tod R. Swann
*Assistant Examiner*—Keith W. Saunders
*Attorney, Agent, or Firm*—David N. Caracappa

[57] ABSTRACT

A method and apparatus is disclosed for reliably storing data to be written to a peripheral device subsystem. The method disclosed includes the following steps. A first peripheral device controller, which includes a cache memory, receives write data from a central processor, stores it in its cache memory, and transmits a copy of it to a second peripheral device controller via a communications path. The second controller, which also includes a cache memory, stores the copy of the write data transmitted to it in its cache memory. Meanwhile the first controller processes the write data. In the event the first controller fails, the second controller processes the write data stored in its cache memory. The apparatus disclosed includes a central processor which generates write data. A first peripheral device controller, which includes a cache memory, is coupled to the central processor. A second peripheral device controller, which also includes a cache memory, is coupled to the first controller via a communications path. The first controller includes circuitry for storing the write data in its cache memory, transmitting a copy of the write data to the secondary controller via the communications path, and processing the write data. The second controller includes circuitry for storing the copy of the write data in its cache memory. The second controller also includes circuitry for processing the write data stored in its cache memory if the first controller fails.

25 Claims, 6 Drawing Sheets

METHOD AND APPARATUS FOR RELIABLY STORING DATA TO BE WRITTEN TO A PERIPHERAL DEVICE SUBSYSTEM USING PLURAL CONTROLLERS

The present invention relates to a redundant peripheral device controller for use in a computer system requiring high reliability operation.

Present computer systems include peripheral devices for communicating with users and/or for storing information. For example, mass storage subsystems use peripheral devices such as disk drives to store large quantities of data for later retrieval and processing. Generally, a central processor in such computer systems is connected to one or more peripheral devices through one or more peripheral device controllers. Present peripheral device controllers generally include a processor, termed a resident processor, to control the operation of that controller and the peripheral devices connected to that controller. The central processor sends a command to the peripheral device controller to perform a desired peripheral device operation, and the resident processor controls the attached peripheral devices to perform the requested operation and notify the central processor of its completion.

Using a disk drive mass storage subsystem as an example, one such peripheral device operation is to write data to a disk drive. In this operation, the central processor supplies data to be written on the disk drive (write data) to the disk drive controller and issues a command to the controller to write that data onto the attached disk drive(s). In order to enhance performance during a write data operation, the disk drive controller temporarily stores the write data received from the central processor in a cache memory in the controller, which is a relatively fast operation. Such an operation is known as write caching. After the write data is written into the cache memory, the controller informs the central processor that the write data has been received and the write data operation is complete. The central processor then is freed to perform other processing tasks. The resident processor subsequently performs the actual writing of the write data from the cache memory onto the disk drive(s). In this manner, the disk drive controller performs the relatively slow process of writing data to the disk drive, while the central processor is allowed to perform other processing tasks, thus, improving the performance of the computer system. A disk drive controller operating in this manner is known as a caching controller.

Computer systems used in critical applications require that data never be lost, even if a component of the system should fail. Such computer systems are called high reliability computer systems. In high reliability computer systems, redundant components are generally used to provide reliable operation in the event of a component failure. For example, when such computer systems include disk drives for storing data, the data is stored on those disk drives in such a manner that it may be retrieved, even if one of the disk drives should fail. A RAID (redundant array of inexpensive disks) system is one known high reliability arrangement for disk drives. RAID 5 is one type of RAID system in which write data, and corresponding error correcting code data, are stored in locations on three or more disk drives in such a manner that even if one disk drive should fail, the data can be retrieved from the remaining operative disk drives. In addition, mass storage subsystems in high reliability computer systems include redundant disk drive controllers: one acting as the primary controller, and the second acting as a secondary or backup controller, ready to take over control of the disk drive subsystem should the primary controller fail.

However, if a caching controller is used, it is possible that data may be lost, even in a RAID 5 system with redundant controllers. If the primary disk drive controller should fail between the time when the central processor writes the write data into the cache memory, and when the write data in the cache memory is written onto the disk drives, the write data remaining in the cache memory would be lost. This is unacceptable in a high reliability computer system. One solution is to not use a caching controller. By eliminating the use of a cache memory, the possibility of losing cached write data is also eliminated. However, this is at the expense of substantial performance degradation, because in this arrangement the central processor must wait for confirmation from the disk drive controller that the relatively slow operation of writing the write data onto the disk drives has been successfully completed before proceeding to other operations.

Another suggested solution permits the use of caching controllers by operating the cache memories in the two redundant controllers in parallel. In this arrangement, should one controller fail, the second controller is able to take over the disk drive control functions, ensuring that the copy of the write data in its cache is properly written to the disk drive(s). This, however, requires that the contents of the two cache memories be maintained identical to each other at all times. This, in turn, requires substantial communications between the two controllers. For example, the write data received from the central processor must be transferred from the primary controller to the secondary controller, along with the required changes to the cache control data structures. In addition, a second message must be sent from the primary controller to the secondary controller when a block of write data is written from the cache memory to the disk drives again outlining the required changes to the cache control data structures. This imposes substantial overhead processing by the resident processors on both of the redundant controllers. This, in turn, requires higher performance resident processors to handle the increased processing load, which increases the cost of the controllers accordingly.

It is desirable to provide a peripheral device subsystem which includes caching controllers, for improved performance of the computer system, while providing redundant storage of the cached write data, but without requiring the substantial overhead of maintaining identical caches on both controllers.

In accordance with principles of the present invention, a method for reliably storing data to be written to a peripheral device subsystem includes the following steps. A first peripheral device controller, which includes a cache memory, receives write data from a central processor, stores it in its cache memory, and transmits a copy of it to a second peripheral device controller via a communications path. The second controller, which also includes a cache memory, stores the copy of the write data transmitted to it in its cache memory. Meanwhile the first controller processes the write data. In the event that the first controller fails, the second controller processes the copies of write data stored in its cache memory.

In accordance with another aspect of the invention, apparatus includes a central processor which generates write data. A first peripheral device controller, which includes a cache memory, is coupled to the central processor. A second peripheral device controller, which also includes a cache memory, is coupled to the first controller via a communications path. The first controller includes circuitry for storing the write data in its cache memory, transmitting a copy of the write data to the secondary controller via the communications path, and processing the write data. The second controller includes circuitry for storing the copy of the write data in its cache memory. The second controller also includes circuitry for processing the write data stored in its cache memory in the event the first controller fails.

Figure 1:
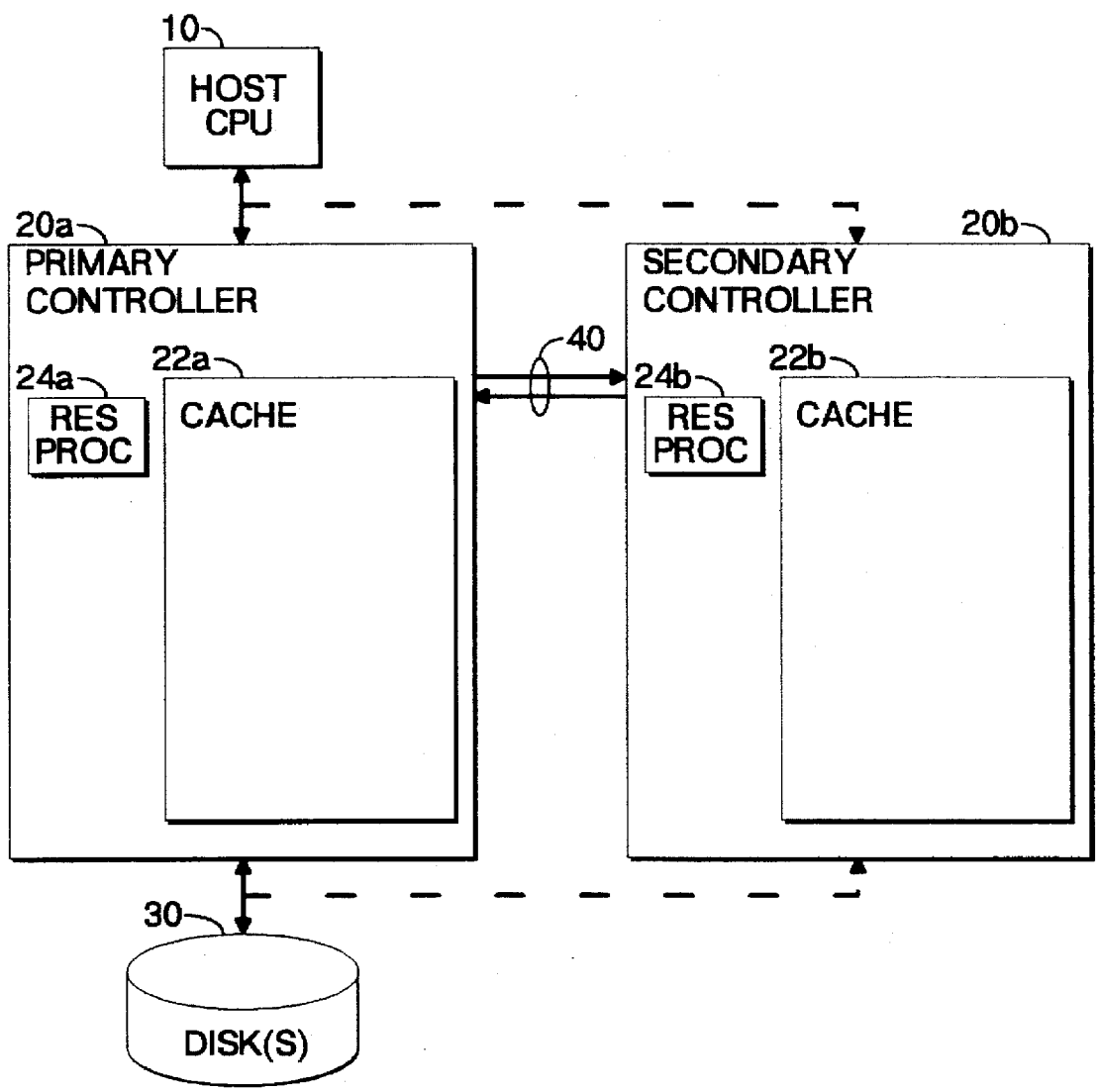
FIG. 1 is a block diagram of a peripheral device subsystem, illustrated as a disk drive subsystem, incorporating the present invention.

In FIG. 1, a host CPU 10 includes a central processor, read/write memory (RAM), read only memory (ROM), and possibly other peripheral devices with associated controllers (none of which are shown) arranged and operating in a known manner. The host CPU 10 is coupled to a primary peripheral device controller 20a, which in the illustrated embodiment is a disk drive controller. The primary disk drive controller 20a is coupled to one or more disk drives 30. The primary disk drive controller 20a is also coupled to a secondary disk drive controller 20b through a communications path 40. The primary and secondary disk drive controllers 20a and 20b each include respective resident processors 24a and 24b and other circuitry (not shown) arranged and operating in a known manner for receiving and executing disk drive commands from the host CPU 10. Furthermore, the primary and secondary disk drive controllers 20a and 20b are each caching controllers and include respective cache memories 22a and 22b which may be used to temporarily store write data from the host CPU 10 until that data is written to the disk drives 30.

Figure 2:
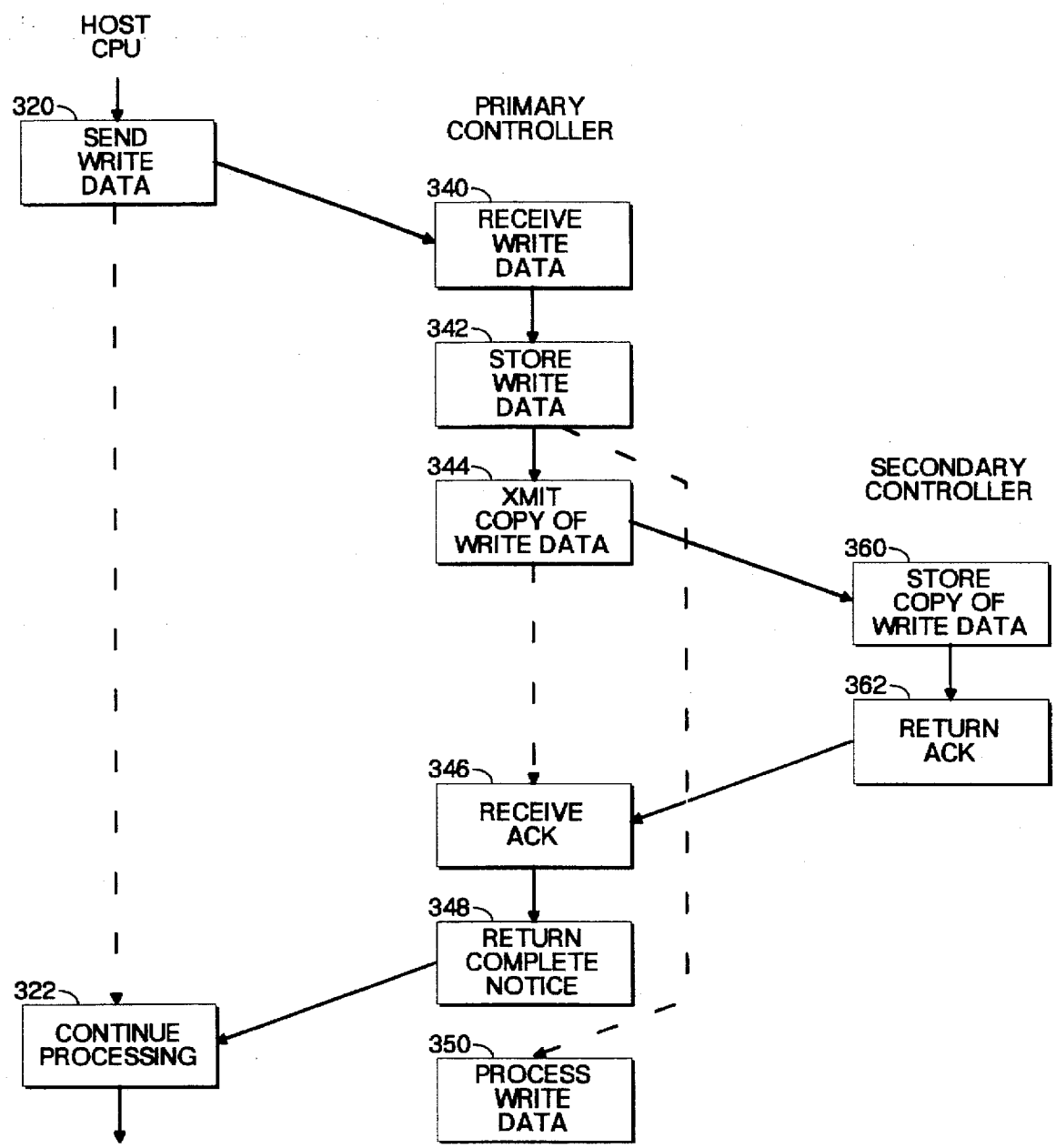
FIG. 2 is a flow chart useful in understanding the normal operation of the peripheral device subsystem according to the present invention.

FIG. 2 is a flow chart useful in understanding the normal operation of the peripheral device subsystem according to the present invention, and will be referred to in the following description. The leftmost column of FIG. 2 illustrates steps performed by the host CPU 10, the middle column illustrates steps performed by the primary controller 20a and the rightmost column illustrates steps performed by the secondary controller 20b. Arrows running between columns illustrate messages or data passed between the respective elements represented by those columns.

In operation, the host CPU 10 (of FIG. 1) sends disk drive commands to the primary controller 20a, which receives these disk drive commands and controls the disk drives 30 to execute those commands, in a known manner. In step 320 of FIG. 2, the host CPU 10 sends a write data command, including a block of write data to the primary controller 20a, and in step 340, the primary controller 20b receives this command and the write data. In step 342, the primary controller 20b stores the write data in its cache memory 22a. In step 344, a copy of the write data is also transmitted to the secondary controller 20b via the communications path 40 in a manner to be described in more detail below. In step 360, the secondary controller 20b stores the copy of the write data received via the communications path 40 from the primary controller 20a in its cache memory 22b.

In step 362, when the write data has been successfully stored in the cache memory 22b, the secondary controller 20b returns an acknowledgement signal (ACK) to the primary controller 20a via the communications path 40, to indicate that the write data was successfully received and stored. In step 346, the primary controller 20a receives the acknowledgement signal ACK via the communications path 40 from the secondary controller 20b, and in step 348, it returns a signal to the host CPU 10 notifying it that the write data command has been successfully completed. In step 322, the host CPU 10 continues other processing tasks. Sometime after step 342, in which the write data received from the host CPU 10 is stored in the cache memory 22a of the primary controller 20a, the primary controller 20a begins the process of transferring the write data from its cache memory 22a to the disk drives 30, in a known manner, as illustrated in step 350.

Should the primary controller 20a fail, the secondary controller 20b takes over control of the disk drive subsystem. The secondary controller 20b now is conditioned to receive disk drive commands from the host CPU 10, and to control the disk drives 30 to execute those commands, as illustrated in phantom in FIG. 1. Any write data which had been previously sent to the primary controller 20a by the host CPU 10 is present in the cache memory of the secondary controller 20b. When it receives control of the disk drives 30, the secondary controller 20b will transfer the write data stored in its cache memory 22b to the disk drives in a manner to be described below. In this way, no data is lost even when the primary controller 20a fails with write data in its cache memory. After this data has been stored in the disk drives, the secondary controller 20b may assume complete control of the disk drive subsystem, and can perform all the tasks which were previously performed by the primary controller 20a.

Figure 3:
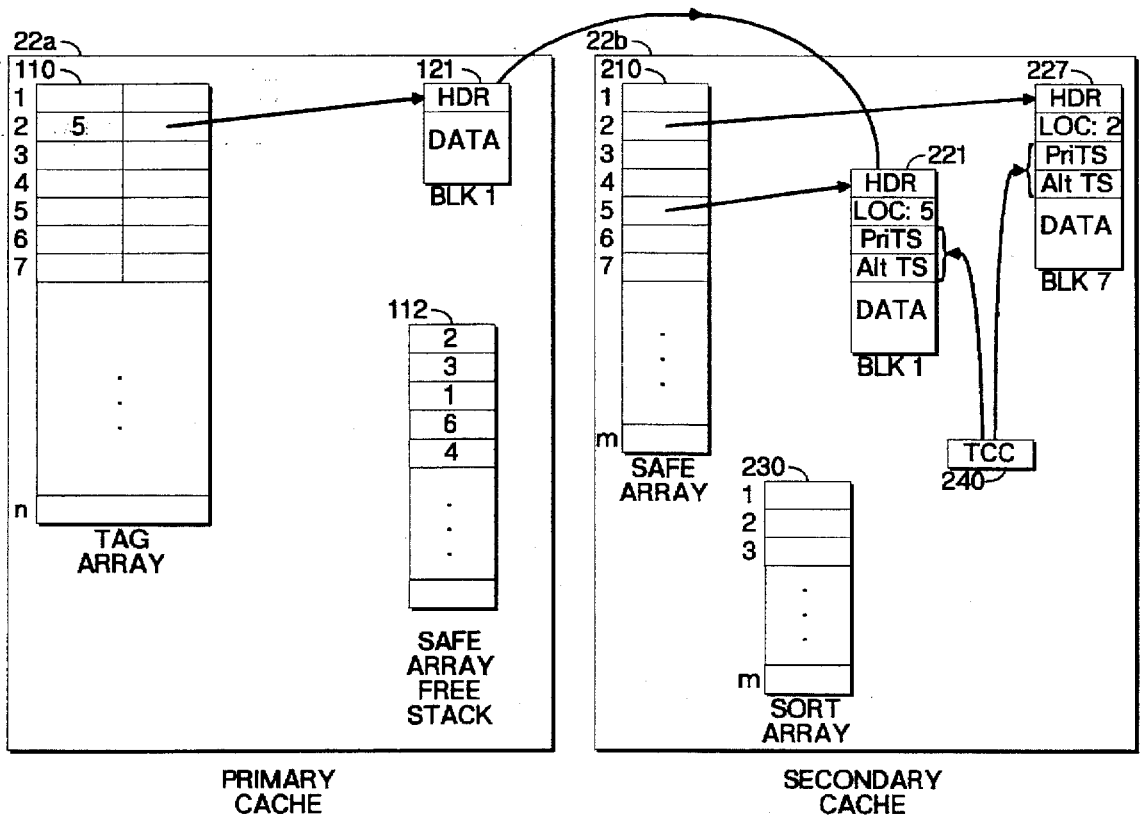
FIG. 3 is a memory layout diagram useful in understanding the operation of the present invention.

FIG. 3 is a memory layout diagram useful in understanding the more detailed operation of the present invention, and will be referred to in the following description. In FIG. 3 the cache memory 22a in the primary controller 20a, called the primary cache, is illustrated as a rectangle on the left hand portion of the figure and the cache memory 22b in the secondary controller 20b, called the secondary cache, is illustrated as a rectangle on the right hand portion of the figure. Rectangular blocks within the respective primary and secondary caches 22a and 22b illustrate blocks of related data stored inside the cache memories. The illustrated locations of these blocks of data within the rectangles representing the respective cache memories 22a and 22b are not meant to illustrate either absolute or relative locations of those data blocks within the memory.

Write data received from the host CPU 10 by the primary controller 20a is stored in the primary cache 22a substantially in a known manner, as in the following brief description. A tag array 110 is maintained in the primary cache 22a, and includes a plurality of entries. The tag array 110 is used to keep track of both the location and attributes of data blocks in the primary cache 22a containing write data to be written to the disk drives 30. When write data is received from the host CPU 10, a header (HDR), which includes information related to the write data such as a logical identifier for the data block and the location on the disk drives 30 into which this data is to be written, is appended to the write data (DATA), and the combination of the header (HDR) and write data (DATA) is stored in a data block in the cache memory 22a. A pointer to the location of each such data block is stored in a portion of a corresponding entry in the tag array 110. When the disk drives 30 are ready to accept a write operation, an entry in the tag array 110 is selected, and the write data (DATA) from the data block corresponding to the selected tag array entry is written to the disk drives 30 at the location contained in the header data (HDR) in the data block. When the write data has been successfully written to the disk drives 30, the entry in the tag array 110, and the corresponding data block, are released, and may be used to store data from later write commands, all in a known manner.

Figure 4:
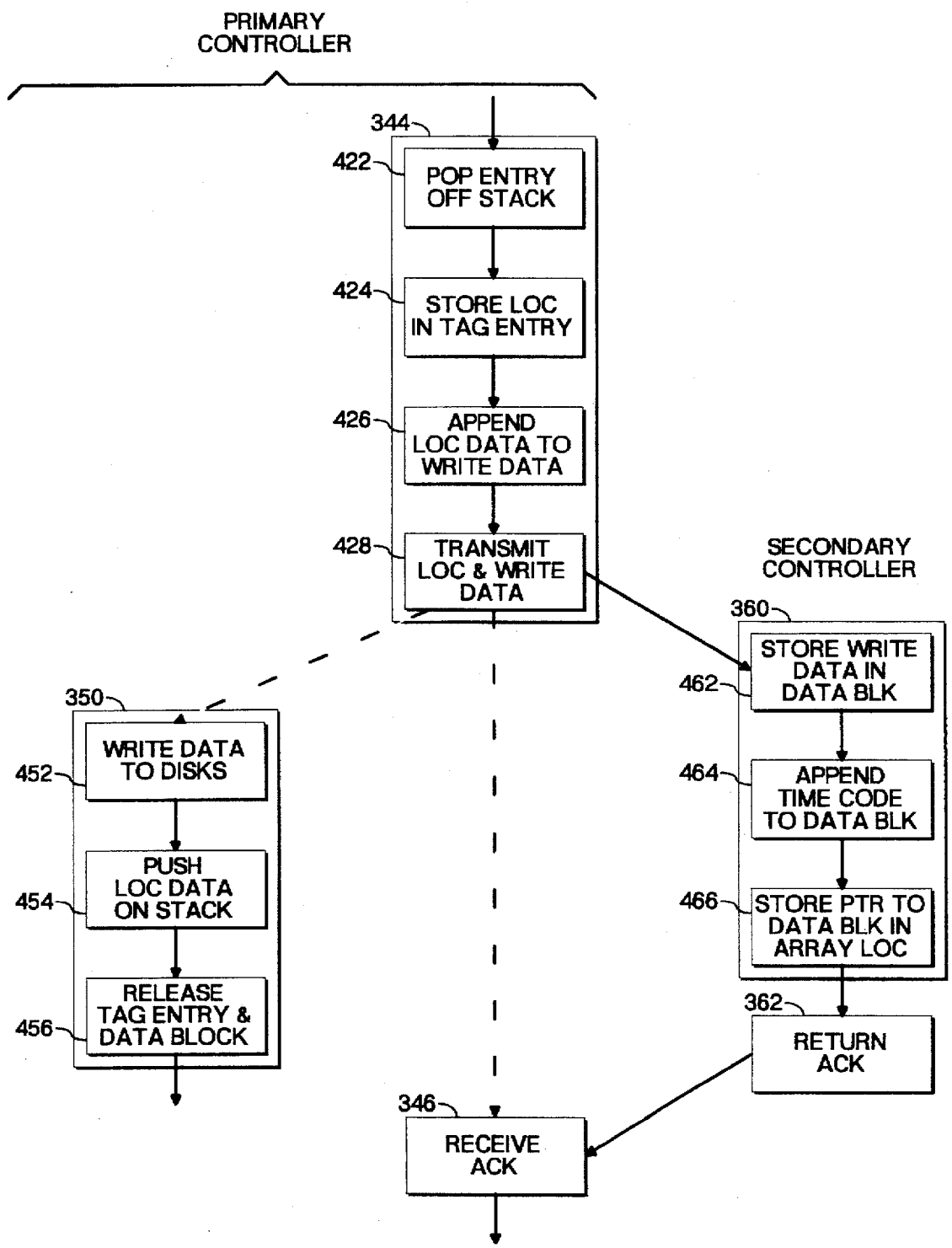
FIG. 4 is a more detailed flow chart useful in understanding the operation of the peripheral device subsystem including cache memory arranged as illustrated in FIG. 3.

FIG. 4 is a more detailed flow chart useful in understanding the operation of the peripheral device subsystem, including cache memories arranged as illustrated in FIG. 3, according to the present invention. The lefthand side of FIG. 4 illustrates steps performed by the primary controller 20a and the righthand side illustrates steps performed by the secondary controller 20b. Arrows running between columns illustrate messages or data passed between the primary and secondary controllers 20a and 20b.

In accordance with the present invention, the write data from the host CPU 10 is also stored in the secondary cache 22b. Referring to FIG. 3, the secondary controller 20b maintains an array of pointers 210, called a safe array, in the secondary cache 22b. Each pointer in the safe array 210 either is empty or points to a data block in the secondary cache 22b containing a copy of write data from a corresponding data block from the primary cache 22a. The primary cache 22a contains a stack 112, called a safe array free stack. Entries in the safe array free stack 112 contain data representing a corresponding pointer in the safe array 210. Initially, i.e. before any write data has been received from the host CPU 10, entries representing every pointer in the safe array 210 are pushed onto the safe array free stack 112.

When write data is received from the host CPU 10 by the primary controller 20a, it is stored in a data block in the primary cache 22a and a corresponding entry in the tag array 110 is allocated, as described above. Referring now to step 422 of FIG. 4, the top entry in the safe array free stack 112, which identifies a location (LOC) of a pointer in the safe array 210 in the secondary cache 22b, is then popped off the stack. In step 424, a copy of this data is stored in the tag array 110 entry allocated to the data block in the primary cache 22a containing the newly received write data. A copy of the write data contained in the data block newly stored in the primary cache 22a, is then prepared for transmission to the secondary controller 20b. In step 426, the safe array 210 pointer location (LOC) represented by the top entry previously popped from the safe array free stack 112 is appended to the header (HDR) of this newly formed data block, which in turn is appended to the write data (DATA). In step 428, the combination of the header data (HDR), containing the pointer location data (LOC), and the write data (WRITE) is then transmitted to the secondary controller 20b via the communications path 40. Steps 422, 424, 426 and 428 are all performed as a part of the step 344 (of FIG. 2) of transmitting a copy of the write data to the secondary controller 20b, as described above.

In step 462, when the secondary controller 20b receives the data block from the primary controller 20a, it is stored in a data block the secondary cache 22b. In step 464, a time code is appended to the header of the data block newly stored in the secondary cache 22b. This time code, and its use and operation, will be described in more detail below. In step 466, the pointer location in the safe array 210 identified by the data in the pointer location slot (LOC) in the header (HDR) of the new stored data block is then set to point to the newly stored data block. Steps 462, 464 and 466 are all performed as a part of the step 360 (of FIG. 2) of storing a copy of the write data in the secondary cache 22b, as described above.

In step 362, when the data block has been successfully received, stored and the pointer in the safe array 210 has been updated, an acknowledgement is returned to the primary controller 20a to indicate the successful receipt and storage of the write data, as described above. At this point, there is a copy of the write data in the respective primary and secondary caches 22a and 22b. In step 346, the acknowledgement from the secondary controller 20b is received by the primary controller 20a. As described above, upon receipt of this acknowledgement, the primary controller notifies the host CPU 10 that the write data command has been completed, allowing the host CPU to continue on to other processing tasks, in a known manner.

In step 452 the write data stored in the data block corresponding to a selected tag entry is written to the disk drives 30 by the primary controller 20a. When the primary controller 20a has successfully written the write data in a data block to the disk drives 30, the write data blocks in the respective primary and secondary caches 22a and 22b containing that write data are no longer required, and may be released for subsequent use. First, in step 454, the safe array pointer location (LOC) in the tag array 110 entry corresponding to the data block containing the write data which has just been written to the disk drives 30 is pushed back onto the safe array free stack 112. This permits the safe array 210 pointer at that location to be used for subsequent write data operations. Then, in step 456, that tag array 110 entry and its corresponding data block are freed up for use by subsequent write data operations. Steps 452, 454 and 456 are performed as part of the step 350 (of FIG. 2) of processing the write data. However, no further messages are exchanged between the primary controller 20a and secondary controller 20b relating to this block of write data. Specifically, no messages are exchanged to indicate that this block of write data has been successfully written to the disk drives 30 by the primary controller 20a.

The content of the secondary cache 22b is not an exact copy of that of the primary cache 22a. The safe array free stack 112 in the primary cache 22a contains only data representing pointers in the safe array 210 which are available for use, either because no blocks of write data have yet been assigned to them, or because a block of write data previously assigned to them has been successfully written to the disk drives 30. There is, therefore, no reason to send further messages between the primary and secondary controllers 20a and 20b. This permits the duplication of the cached write data without extensive intercontroller communications, and the associated overhead on the respective resident processors 24a and 24b on the primary and secondary controllers 20a and 20b.

FIG. 3 illustrates the state of the respective primary and secondary caches 22a and 22b at a point in time. A block of write data, BLK1, which had been previously transferred from the host CPU 10 to the primary controller 20a, but has not yet been transferred to the disk drives 30, is stored in a data block 121 along with a header describing this block of write data. An entry in the tag array 110, labeled 2, has been allocated to that data block and contains data representing that data block, including a pointer to the data block 121 represented by an arrow from the right hand rectangle in entry 2 to the data block 121. A safe array pointer location, 5 in this case, had been popped off the safe array free stack 112, and is stored in entry 2 of the tag array 110, as represented by the left hand rectangle in entry 2. The block of write data BLK1, with its specified safe array pointer location (LOC: 5) appended to the header, was then transferred to the secondary controller 20b via the communications path 40. The received block of write data BLK1 was stored in data block 221 in the cache memory 22b in the secondary controller 20b, as illustrated by the arc running from data block 121 to data block 221. As directed by the primary controller 20a, a pointer to data block 221 was placed in safe array 210 location 5, as is illustrated by an arrow from location 5 in the safe array 210 to the data block 221.

A block of write data BLK7 has just been successfully written to the disk drives 30. The data block in the primary cache 22a storing BLK7 and the corresponding entry in the tag array 110 have both been released. The location in the safe array 210 in the cache memory 22b of the secondary controller 20b which had been designated to point to this data block was location 2. As described above, this location was pushed back onto the safe array free stack 112, and appears at the top of the stack 112. However, also as described above, no message is sent to the secondary controller 20b when a data block is written to the disk drives 30. Thus, in the cache memory 22b of the secondary controller 20b, entry 2 in the safe array 210 still points to a data block 227, which contains the block of write data BLK7.

When the next block of write data is received from the host CPU 10, it will be stored in a data block in the primary cache 22a and an entry in the tag array 110 will be allocated to that data block. Location 2 in the safe array 210 will be popped off the safe array free stack 112 and stored in the corresponding tag array entry 110. This location will also be appended to the header of the data block and the data block will be transferred to the secondary controller 20b. This block of data will be written into a data block in the secondary cache 22b and entry 2 in the safe array 210 will be set to point to that data block. Data block 227 containing the block of write data BLK7 will be freed in this way.

Figure 5:
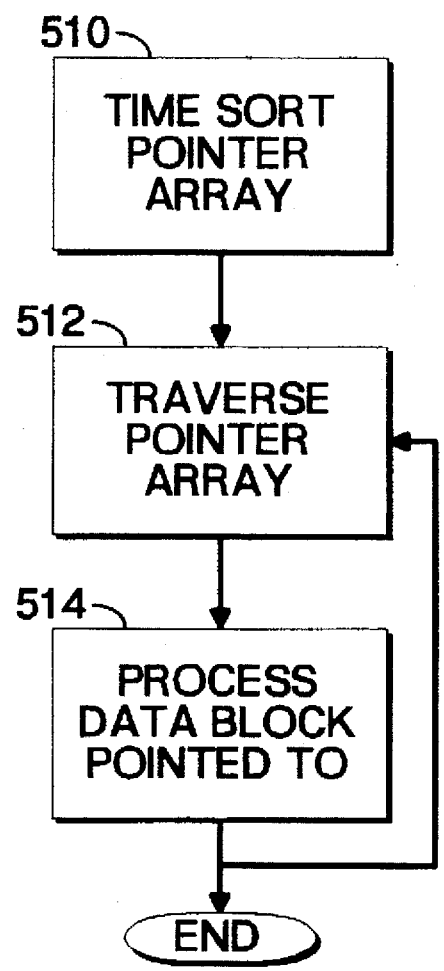
FIG. 5 is a flow chart useful in understanding the operation of the secondary controller after the failure of the primary controller.

FIG. 5 is a flow diagram useful in understanding the operation of the secondary controller 20b if it becomes necessary for the secondary controller 20b to assume control of the disk drive subsystem because of the failure of the primary controller 20a. If the primary controller 20a should fail, the data blocks in the secondary cache 22b pointed to by the entries in the safe array 210 will be written to the appropriate locations in the disk drives 30, as stored in the headers of those data blocks.

However, there may be more than one data block containing write data for a particular location on the disk drives 30. To properly write the data in the secondary cache 22b to the disk drives 30, the data blocks must be written to the disk drives in the time order they were received from the host CPU 10 so that write data for a particular disk location received later over-writes write data for that same disk location received earlier. To permit this, a time code is assigned to every data block written into the secondary cache 22b when it is received from the primary controller 20a, as described above with reference to step 464 of FIG. 4. Referring to FIG. 3, this time code is appended to a time code slot (TC) the header of that data block.

In step 510 of FIG. 5, the pointers in the safe array 210, representing the data blocks in the secondary cache 22b, are first sorted into time order based on the time code in the time code slot (TC) of each block in any one of many known methods. For example a heap sort using a second array of pointers 230 called a sort array may be used. In step 512, each of the pointers is traversed in the sorted order. In step 514, the data block pointed to by the current pointer is written to the disk drives 30. This is repeated until all of the pointers have been processed. The data blocks are, thus, written to the disk drives 30 one at a time in the order received until all the data blocks have been stored on the disk drives 30. In this way, if two data blocks contain write data for the same location on the disk drives, the later data overwrites the earlier data.

Once the write data previously stored in the cache memory 22b of the secondary controller 20b is properly written to the disk drives 30, as described above, the secondary controller can take over control of the disk drive subsystem. In this way, no data is lost, despite the failure of the primary controller 20a, and the computer system continues to operate using the secondary controller 20b.

Referring to FIG. 3, the time code written into the time code slots (TC) of the data blocks stored in the secondary cache 22b may, for example, be the current value in a time code counter (TCC) 240, which may be a location in the secondary cache 22b maintained by the resident processor 24b in the secondary controller 20b in a known manner. When a data block is received, the value of the time code counter 240 is copied into the time code slot (TC) in the newly received data block, and the time code counter 240 is incremented. However, if a counter is used to provide the time codes, then there is the possibility that the counter will recycle its value to zero when incremented after reaching its maximum count, a process called overflow. Time code overflow must be avoided to prevent a newer data block from being assigned an earlier time code than a older data block.

To avoid time code counter overflow, the time codes of the data blocks stored in the secondary cache 22b are periodically resequenced and the time code counter 240 reset. Resequencing is invoked automatically, for example when the time code counter 240 reaches a predetermined count, and is performed as a low priority process executed in the background by the resident processor 24b in the secondary controller 20b so that it does not affect the normal processing of data blocks received from the primary controller 20a. If a time code counter is used, then two time code slots, a primary time code slot (Pri TC) and an alternate time code slot (Alt TC), are provided in each header of each data block stored in the secondary cache memory 22b.

Figure 6:
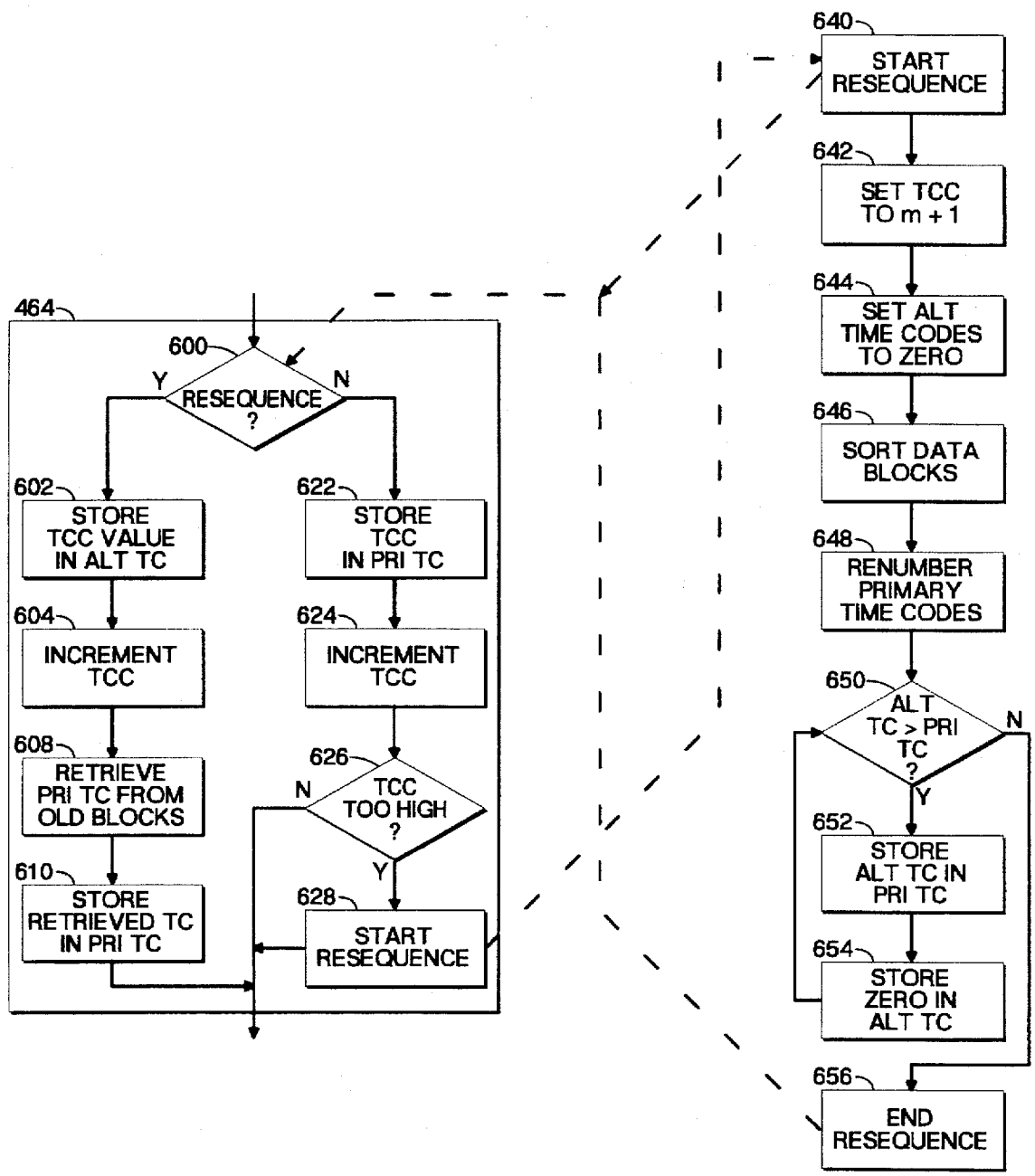
FIG. 6 is a more detailed flow diagram useful in understanding the maintenance and use of time codes in the data blocks stored in the secondary controller.

FIG. 6 is a more detailed flow diagram useful in understanding the maintenance and use of time code counter 240 and the primary and alternate time code slots (Pri TC and Alt TC) in the data blocks stored in the secondary controller 20b. The lefthand portion of FIG. 6 is a more detailed flow diagram of step 464 of FIG. 4. The righthand portion of FIG. 6 is a flow diagram of the background resequence operation.

In step 600, one of two different processing paths is followed depending on whether a resequence operation is in progress. If a resequence operation is not in progress, the current value of the time code counter 240 is written into the primary time code slot (Pri TC) of each newly received data block in step 622. Then, in step 624 the time code counter 240 is incremented. In step 626, the value of the time code counter 240 is tested. If it greater than some predetermined count, then a resequence operation is started in step 628, as described above, illustrated in FIG. 6 by the dashed line from step 628 to step 640, which is the starting step of the resequence operation. Otherwise, step 464 of FIG. 4 completes without invoking a resequence operation.

During a resequencing operation, the time codes in the primary time code slots (Pri TC) of the data blocks are renumbered, starting from zero, while maintaining the same relative order, in a manner to be described in more detail below. Thus, special arrangements must be made to ensure that a proper time code is assigned to newly received data blocks during the resequencing operation. When a data block is received during the resequence operation, the current value of the time code counter placed in the alternate time code slot (Alt TC) of the newly received data block, in step 602, and in step 604 the time code counter is incremented. In step 608, the time code value in the primary time code slot (Pri TC) is retrieved from any data block which is displaced by the newly received data block, and in step 610, that time code is stored in the primary time code slot (Pri TC) of the newly received data block.

The background processing during a resequence operation is initiated in step 640. In step 640, the process of assigning time codes to newly received data blocks is controlled by, for example, setting a flag which is tested in step 600, illustrated in FIG. 6 by a dashed line from step 640 to step 600. In step 642, the value in the time code counter 240 is set to one more than the number of pointers (m) in the safe array 210, which in the illustrated embodiment is m+1. In step 644, the value stored in the alternate time code slots (Alt TC) of all the data blocks pointed to by the entries in the safe array 210 is set to zero. Then, in step 646, these data blocks are sorted based on the values stored in the primary time code slots (Pri TC), using a known heap sort process and the sort array 230. When the sort is complete, the data blocks are in order from the oldest to the newest. Then, in step 648, the time code values in the primary time code slots (Pri TC) of the data blocks, taken in sorted order, are renumbered sequentially starting from zero. I.e., the value zero is stored in the primary time code slot (Pri TC) of the oldest data block, the value one is stored in the next oldest data block, and so forth.

Finally, when the renumbering is complete, a check must be made to determine whether any of the data blocks were newly received while the resequencing operation was in progress. As described above, during the resequence operation, the values stored in the primary time code slots (Pri TC) of the data blocks are renumbered starting at zero, and there can be no more data blocks than the number of entries in the safe array 210, which in FIG. 3 is m. Thus, the highest value which can be stored in a primary time code slot (Pri TC) is m. However, in step 642 at the beginning of the resequence operation, the time code counter 240 is set to one more than the number of entries in the safe array 210, which in FIG. 3 is m+1, and in step 644 all alternate time code slots (Alt TC) are set to zero. Thus, when a data block is received during the resequence operation, a time code value which is greater then the number of slots (m) in the safe array is stored in the alternate time code slot (Alt TC). If the value in the alternate time code slot (Alt TC) is greater than the value in the primary time code slot (Pri TC), this indicates that this data block was received during the resequence operation. After the primary time code slots (Pri TC) have been renumbered as described above, all of the data blocks are traversed. In step 650, if a data block is found in which the value in the alternate time code slot (Alt TC) is greater than the value in the primary time code slot (Pri TC), then in step 652 the value in the alternate time code slot (Alt TC) is copied into the primary time code slot (Pri TC) and in step 654 the value in the alternate time code slot (Alt TC) is set to zero. When all the data blocks have been checked, the resequence operation ends, in step 656. Step 656 resets the flag which is tested by step 600, and normal operations may then restart until the time code counter again reaches the value which triggers the resequence operation.

A peripheral device subsystem has been described above which permits improved performance resulting from the caching of write data, and improved reliability resulting from: the use of redundant caching controllers, the storage of redundant copies of write data in the cache memories of both redundant controllers, and the ability to recover without data loss from the failure of the primary controller, but without high overhead processing drain on the resident processors in the redundant controllers. An embodiment of such a peripheral device subsystem has been illustrated above as a disk drive subsystem, but one skilled in the art will understand that the present invention may be used in any peripheral device subsystem using redundant caching controllers which cache write data before processing it, such as tape drive or other mass storage subsystems.

What is claimed is:

1. In a computer system including a central processor coupled to first and second redundant peripheral device controllers coupled together by a communications path, each including a cache memory, wherein the cache memory in the second controller contains an array of pointers each capable of pointing to a block of memory in the cache memory of the second controller, and the cache memory in the first controller contains a stack containing a plurality of entries, each stack entry containing data representing a respective one of the pointers in the array of pointers, a method for reliably storing write data comprising the steps of:

receiving write data from the central processor in the first controller;

storing the write data in the cache memory of the first controller;

transmitting a copy of the write data from the first controller to the second controller via the communications path by:

popping the top stack entry off the stack;

appending the pointer representative data contained in the popped stack entry to the copy of the write data; and transmitting the combination of the pointer representative data and the copy of the write data to the second controller; and storing the transmitted copy of the write data in the cache memory of the second controller by:

storing the transmitted copy of the write data in a block of memory in the cache memory of the second controller; and storing a pointer to the block of memory containing the transmitted copy of the write data in the one of the pointers in the array of pointers represented by the appended pointer representative data; and processing the write data in the first controller.

2. The method of claim 1, wherein the first controller is subject to failure, and further comprising the step of, if the first controller fails, processing the copy of the write data in the second controller.

3. The method of claim 2 wherein the step of processing the copy of the write data in the second controller comprises the steps of:

traversing every one of the pointers in the array of pointers in cache memory of the second controller; and if the one of the pointers points to a block containing a copy of write data, processing the copy of write data contained in the block pointed to by the one of the pointers in the second controller.

4. The method of claim 3 wherein:

the step of storing the copy of the write data in a block of memory in the cache memory of the second controller comprises the step of appending a time code to the block of memory containing the write data; and the step of processing the copy of the write data in the second controller further comprises, before the traversing step, the steps of:

sorting the entries in the array of pointers based on the value of the time code appended to the write data; and traversing every entry in the array of pointers in sorted order.

5. The method of claim 4 wherein the step of appending a time code comprises the steps of:

appending the value of a counter to the block of memory containing the write data; and incrementing the counter.

6. The method of claim 5 further comprising the steps of:

periodically resequencing the time code values appended to the blocks of memory containing write data; and resetting the value of the counter.

7. The method of claim 1, wherein the cache memory in the first controller further contains a tag array, containing a plurality of tag entries, and wherein:

the step of storing write data in the first controller comprises the steps of:

storing the write data in a data block in the cache memory of the first controller;

allocating a tag entry to correspond to the data block containing the write data; and storing a pointer to the data block containing the write data in the allocated tag entry;

the transmitting step further comprises the step of, after the popping step, storing the pointer representative data in the allocated tag entry; and the processing step comprises the steps of:

selecting an entry in the tag array;

processing the data block corresponding to the selected tag entry;

pushing the pointer representative data in the selected tag entry onto the stack; and releasing the tag entry.

8. The method of claim 1, further comprising, after the step of storing the transmitted copy of the write data, the step of returning an acknowledgement from the second controller to the first controller via the communications path.

9. The method of claim 8, further comprising, after the acknowledgement step, the step of notifying the central processor that the write data has been successfully received.

10. The method of claim 1, wherein the first controller is subject to failure, and further comprising the step of, if the first controller #ails, processing the copy of the write data in the second controller.

11. The method of claim 10, wherein the system further comprises a peripheral device coupled to the first and second controllers, and the step of processing the copy of the write data comprises the step of writing the copy of the write data from the second controller to the peripheral device.

12. The method of claim 1, wherein the system further comprises a peripheral device coupled to the first and second controllers, and the processing step comprises the step of writing the write data from the first controller to the peripheral device.

13. A computer system comprising:

a central processor, for producing write data;

first and second redundant peripheral device controllers, each coupled to the central processor and including a respective cache memory; and a communications path coupled between the first and second controllers; wherein:

the first controller comprises:

circuitry for receiving the write data from the central processor;

circuitry for storing the write data in its cache memory circuitry for maintaining in its cache memory a stack containing a plurality of entries, each stack entry containing data representing a respective one of an array of pointers maintained in the cache memory of the second controller;

circuitry for transmitting a copy of the write data from the first controller to the second controller via the communications path, wherein the transmitting circuitry comprises:

circuitry for popping the top stack entry off the stack;

circuitry for appending the pointer representative data contained in the popped stack entry to a copy of the write data; and circuitry for transmitting the combination of the pointer representative data and the copy of the write data to the second controller; and circuitry for processing the write data; and wherein:

the second controller comprises:

circuitry for maintaining in its cache memory an array of pointers each capable of pointing to a block of memory in its cache memory;

circuitry for storing the transmitted copy of he write data in its cache memory, wherein the circuitry for storing the transmitted copy of the write data comprises:

circuitry for storing the transmitted copy of the write data in a block of memory in the cache memory of the second controller; and circuitry for storing a pointer to the block of memory containing the transmitted copy of the write data in the one of the pointers in the array of pointers represented by the appended pointer representative data.

14. The system of claim 13, wherein the first controller is subject to failure, and the second controller further comprises circuitry for processing the copy of the write data in the second controller, if the first controller fails.

15. The system of claim 14, wherein the circuitry for processing the copy of the write data in the second controller comprises:

circuitry for traversing every one of the pointers in the array of pointers in cache memory of the second controller; and circuitry for processing the copy of write data contained in the block pointed to by the one of the pointers in the second controller if the one of the pointers points to a block containing a copy of write data.

16. The system of claim 15, wherein:

the circuitry for storing the copy of the write data in a block of memory in the cache memory of the second controller comprises circuitry for appending a time code to the block of memory containing the write data; and the circuitry for processing the copy of the write data in the second controller further comprises:

circuitry for sorting the entries in the array of pointers based on the value of the time code appended to the write data; and circuitry for traversing every entry in the array of pointers in sorted order.

17. The system of claim 16, wherein the circuitry for appending a time code comprises:
  circuitry for appending the value of a counter to the block of memory containing the write data; and
  circuitry for incrementing the counter.

18. The system of claim 17 wherein the second controller further comprises:
  circuitry for periodically resequencing the time code values appended to the blocks of memory containing write data; and
  circuitry for resetting the value of the counter.

19. The system of claim 13, wherein:
  the first controller further comprises circuitry for maintaining a tag array, containing a plurality of tag entries, in its cache memory;
  the circuitry for storing write data in the first controller comprises:
    circuitry for storing the write data in a data block in the cache memory of the first controller;
    circuitry for allocating a tag entry to correspond to the data block containing the write data; and
    circuitry for storing a pointer to the data block containing the write data in the allocated tag entry;
  the transmitting circuitry further comprises circuitry for storing the pointer representative data in the allocated tag entry; and
  the processing circuitry comprises:
    circuitry for selecting an entry in the tag array;
    circuitry for processing the data block corresponding to the selected tag entry;
    circuitry for pushing the pointer representative data in the selected tag entry onto the stack; and
    circuitry for releasing the tag entry.

20. The system of claim 13, wherein the second controller further comprises circuitry for returning an acknowledgement from the second controller to the first controller via the communications path when the transmitted copy of the write data has been stored.

21. The system of claim 20, wherein the first controller further comprises circuitry, responsive to an acknowledgement received from the second controller, for notifying the central processor that the write data has been successfully received.

22. The system of claim 13, wherein the first controller is subject to failure, and the second controller further comprises circuitry for processing the copy of the write data in the second controller, if the first controller fails.

23. The system of claim 22, further comprising a peripheral device coupled to the first and second controllers, wherein the circuitry in the second controller for processing the copy of the write data comprises circuitry for writing the copy of the write data from the second controller to the peripheral device.

24. The system of claim 13, further comprising a peripheral device coupled to the first and second controllers, wherein the processing circuitry in the first controller comprises circuitry for writing the write data from the first controller to the peripheral device.

25. The system of claim 13, wherein:
  the first controller comprises a resident processor, and the receiving, storing, transmitting and processing circuitry are comprised in its resident processor; and
  the second controller comprises a resident processor, and the storing circuitry is comprises in its resident processor.

* * * * *